United States Patent Office 3,409,722
Patented Nov. 5, 1968

3,409,722
NOVEL 16-OXIMIDOMETHYLENE-GONANES
Daniel Bertin, Montrouge, and Lucien Nedelec, Clichy-sous-Bois, France, assignors to Roussel-UCLAF, Paris, France, a corporation of France
No Drawing. Filed May 9, 1966, Ser. No. 548,414
Claims priority, application France, May 14, 1965, 17,103; Aug. 11, 1965, 28,020
13 Claims. (Cl. 424—243)

The invention relates to novel 16-oximidomethylene steroids having an aromatic A-ring and which have the formula

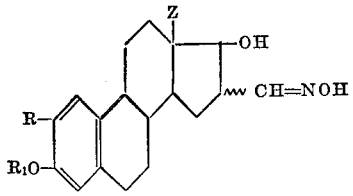

wherein $R_1$ is selected from the group consisting of hydrogen and lower alkyl of 1 to 7 carbon atoms, R is selected from the group consisting of hydrogen and halogen and Z is alkyl of 1 to 4 carbon atoms. The invention also relates to a novel process for the preparation of the 16-oximidomethylene steroids of Formula I. The invention further relates to novel hypocholesterolemic compositions and to a novel method of treating hypercholesterolemia in mammals.

Our copending commonly assigned U.S. patent application Ser. No. 556,796 filed on even date herewith with the title Novel Gonane Derivatives, describes steroids analogous to Formula I except that they possess a 16,17-isoxazolino-17ξ hydroxyl grouping which possess hypocholesterolemic activity. The 16-oximidomethylene steroids of Formula I have a very intense hypocholesterolemic acivity and a very weak estrogenic activity and much weaker than that of the 16,17-isoxazolino steroids of our copending application. For example, 3-methoxy-16ξ - oximidomethylene - $\Delta^{1,3,5(10)}$ - estratriene - 17β - ol has about one half of the estrogenic activity of $\Delta^{2'}$-(4',5'-16,17) - isoxazolino - 3 - methoxy -$\Delta^{1,3,5(10)}$ - estratriene-17ξ-ol.

It is an object of the invention to provide the novel 16-oximidomethylene steroids of Formula I.

It is another object of the invention to provide a novel process for the preparation of the 16-oximidomethylene steroids of Formula I.

It is a further object of the invention to provide novel hypocholesterolemic compositions.

It is an additional object of the invention to provide a novel method of treating hypercholesterolemia in mammals.

These and other objects and advantages of the invention will become obvious from the following detailed description.

The novel 16-oximidomethylene steroids of the invention have the following formula

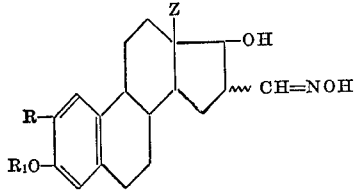

wherein $R_1$ is selected from the group consisting of hydrogen and lower alkyl of 1 to 7 carbon atoms, R is selected from the group consisting of hydrogen and halogen and Z is alkyl of 1 to 4 carbon atoms, $R_1$ may be a halogen such as fluorine, chlorine, bromine and iodine.

The process of the invention for the preparation of the 16-oximidomethylene steroids of Formula I comprises reducing with lithium aluminum hydride a 16,17-isoxazolino steroid of the formula

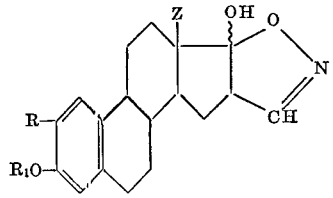

wherein R, $R_1$ and Z have the above definitions to obtain a 16-oximidomethylene steroid of Formula I and recovering the latter.

Originally, we believe that the product resulting from the reduction of the —C=N— group of the compounds of Formula II resulted in a heterocyclic dihydro-isoxazolino group of the formula

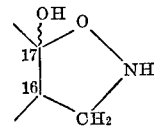

and this was the formula indicated in our French Convention application. Subsequent analysis has established that the reduction of the hemiacetal group of the isoxazolino group resulted in the opening of the ring to form 16-oximidomethylene steroids of the Formula I.

The starting 16,17-isoxazolino steroids can be prepared according to the process described in our above-mentioned copending U.S. patent application which comprises reacting a 2-R-3-OR$_1$-13-Z-16-hydroxymethylene-$\Delta^{1,3,5(10)}$-gonatriene-17-one with hydroxylamine or an acid addition salt thereof to form the corresponding 16,17-isoxazolino steroid of Formula II.

The novel hypocholesterolemic compositions of the invention are comprised of at least one 16-oximidomethylene steroid of the formula

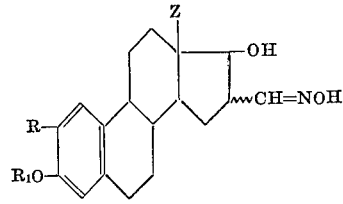

wherein $R_1$ is selected from the group consisting of hydrogen and lower alkyl of 1 to 7 carbon atoms, R is selected from the group consisting of hydrogen and halogen and Z is alkyl of 1 to 4 carbon atoms and a major amount of a pharmaceutical carrier. The said compositions may be in the form of injectable solutions or suspensions, in ampules, in multiple dose flacons, in the form of tablets, coated tablets, sublingual tablets, capsules and suppositories prepared in the usual manner. The said steroids may be administered orally, perlingually, transcutaneously or rectally. The usual daily dosage is between 20γ to 400 γ/kg. in the adult depending upon the method of administration.

Due to their intense hypocholesterolemic activity with very low estrogenic activity, the steroids of Formula I are useful for the treatment of hypercholesterolemia. They are useful for the prevention and cure of arterial disorders, cerebral arteritis, aortitis, coronaritis, chest angina and atheromatosis.

The novel 16-oximidomethylene steroids of Formula I may, if desired, be alkylated according to usual methods to form the corresponding 3-$OR_1$-16ζ-alkoximidomethylene-13-Z-$\Delta^{1,3,5(10)}$-gonatriene-17β-ols, such as for example the 3 - methoxy - 16ζ-methoximidomethylene-13β-methyl-$\Delta^{1,3,5(10)}$-gonatriene-17β-ol, having a melting point of 156–158° C. and a specific rotation of $[\alpha]_D^{20} = +50°$ (c=0.9%, chloroform).

These novel alkoximido compounds possess hypocholestrolemic properties.

In the following example there are described several preferred embodiments to illustrate the invention. However, it should be understood that the invention is not intended to be limited to the specific embodiments.

EXAMPLE

Preparation of 3-methoxy-16ζ-oximidomethylene-$\Delta^{1,3,5(10)}$-estratriene-17β-ol Step A.—Preparation of $\Delta^{2'}$-(4',5',16,17)-isoxazolino-3-methoxy $\Delta^{1,3,5(10)}$-estratriene-17ζ-ol:

5 gm. of 3-methoxy-16-hydroxymethylene-$\Delta^{1,3,5(10)}$-estratriene-17-one, prepared according to the process of Ruggieri et al. (Gazz. vol. 93, 1963, p. 269), were admixed with 150 cc. of ethanol and 1.45 gm. of hydroxylamine hydrochloride and the resulting mixture was held at reflux for 1 hour. Then, the reaction mixture was cooled to 20° C., neutralized with 2 cc. of triethylamine and concentrated to a volume of 50 cc. under vacuum with stirring. 150 cc. of water were added thereto and the mixture was cooled. The precipitate obtained was vacuum filtered, washed with water until the wash waters were neutral and dried under vacuum to obtain 5.23 gm. of raw product which was purified by recrystallization from ethyl acetate to obtain 2.31 gm. (44% yield) of $\Delta^{2'}$-(4',5'-16,17)-isoxazolino-3-methoxy $\Delta^{1,3,5(10)}$-estratriene-17ζ-ol, having a melting point of 241–242° C. and a specific rotation of $[\alpha]_D^{20} = +113°$ (c=0.8% in dimethylformamide).

The product occurred in the form of crystalline needles which were slightly soluble in alcohol and insoluble in water.

Analysis.—$C_{20}H_{25}O_3N$; molecular weight=327.41. Calculated: C, 73.37%; H, 7.70%; N, 4.28%. Found: C, 73.3%; H, 7.7%; N, 4.2%.

Step B.—Preparation of 3-methoxy-16ζ-oximidomethylene $\Delta^{1,3,5(10)}$-estratriene-17β-ol:

200 cc. of tetrahydrofuran and 160 cc. of ether were added to 4 gm. of $\Delta^{2'}$-(4',5'-16,17)-isoxazolino-3-methoxy-$\Delta^{1,3,5(10)}$-estratriene-17ζ-ol and after the suspension was brought to a temperature of 0° C., 4 gm. of lithium aluminum hydride were slowly added thereto. The reaction mixture was maintained at the tempertaure from 0° C. to +5° for 30 minutes, after which the excess of the lithium aluminum hydride was destroyed by the addition of 15 cc. of ethyl acetate. Then, about 100 cc. of a saturated solution of sodium chloride were slowly added to the reaction mixture under stirring. The resulting organic phase was decanted, washed with a saturated solution of sodium chloride, dried over sodium sulfate, filtered and evaporated to dryness under vacuum to obtain 4.700 gm. of raw product which was subjected to chromatography through silica gel and the product was eluted with methylene chloride containing 1% of methanol to obtain 2.500 gm. of product having a melting point of 187–188° C. The said product was further purified by recrystallization from ethyl acetate to obtain 1.700 gm. of 3-methoxy-16ζ - oximidomethylene-$\Delta^{1,3,5(10)}$-estratriene-17β-ol having a melting point of 188° C. and a specific rotation of $[\alpha]_D^{20} + 39°$ (c=0.8% in dimethylformamide).

The said product occurred in the form of colorless, crystalline needles which were soluble in pyridine and insoluble in water, alcohol, ether, benzene and chloroform.

Analysis.—$C_{20}H_{27}O_3N$; molecular weight=329.42. Calculated: C, 72.92%; H, 8.26%; N, 4.25%. Found: C, 72.8%; H, 8.3%; N, 4.2%.

This product is not described in the literature.

Using the same procedure, $\Delta^{2'}$-(4',5'-16,17)-isoxazolino-2-fluoro-$\Delta^{1,3,5(10)}$-estratriene-3,17ζ-diol, $\Delta^{2'}$-(4',5'-16, 17) - isoxazolino-13β-ethyl-$\Delta^{1,3,5(10)}$-gonatriene-3,17ζ-diol can be converted to 2 - fluoro - 16 - oximidomethylene-$\Delta^{1,3,5(10)}$-estratriene-3,17β-diol and 13β-ethyl-16-oximidomethylene-$\Delta^{1,3,5(10)}$-gonatriene-3,17β-diol respectively.

PHARMACOLOGICAL DATA (1) Hypocholesterolemic action on the female rat

The work was carried out on groups of female rats having an average weight of 200 gm. 3-methoxy-16ζ-oximidomethylene-$\Delta^{1,3,5(10)}$-estratriene-17β-ol was administered orally in aqueous suspension to the animals at daily doses of 50 and 100 γ/kg. for a period of 10 days. Another group of female rats of same age and weight served as control. Samples of blood were taken on the 11th day with a view to determine the amount of seric sterols. The animals were sacrificed on the same day and the uterus, liver and suparenal glands were separated and weighed. The decrease in the amount of the seric sterols was 37% at the dose of 50 γ/kg. per day, and 42% at the dose of 100 γ/kg. per day which demonstrates that the said compound has a significant hypocholesterolemic activity.

(2) Investigation of estrogenic activity—Allen-Doisy Test

3 - methoxy - 16ζ-oximidomethylene-$\Delta^{1,3,5(10)}$-estratriene-17β-ol in an aqueous dispersant was administered orally to groups of castrated female rats at varying doses. Vaginal smears were taken each day starting from the second day of treatment for a period of seven days. Only those smears formed exclusively of keratinized cells were retained as positive. The rat unit for the said product was about 2 mg. to a rat unit of 1 mg. for $\Delta^{2'}$-(4',5'-16,17)-isoxazolino-3-methoxy-$\Delta^{1,3,5(10)}$-estratriene-17ζ-ol.

Various modifications of the compounds and process of the invention may be made without departing from the spirit or scope thereof and it is to be understood that the invention is to be limtied only as defined in the appended claims.

We claim:

1. A 16ζ-oximidomethylene steriod of the formula

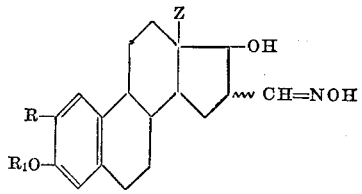

I wherein $R_1$ is selected from the group consisting of hydrogen and lower alkyl of 1 to 7 carbon atoms, R is selected from the group consisting of hydrogen and halogen and Z is alkyl of 1 to 4 carbon atoms.

2. A compound of claim 1, wherein Z is methyl.

3. A compound of claim 1 which is 3-methoxy-16ζ-oximidomethylene-$\Delta^{1,3,5(10)}$-estratriene-17β-ol.

4. A process for the preparation of the 16ζ-oximidomethylene steroid of claim 1 which comprises reducing with lithium aluminum hydride a 16,17-isoxazolino steroid of the formula

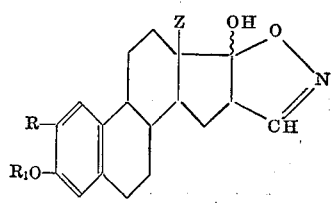

II wherein $R_1$ is selected from the group consisting of hydrogen and lower alkyl of 1 to 7 carbon atoms, R is selected from the group consisting of hydrogen and halogen and Z is alkyl to 1 to 4 carbon atoms to obtain the corresponding 16ʃ-oximidomethylene steroid.

5. The process of claim 4 wherein Z is methyl.

6. A hypocholesterolemic composition comprising at least one 16ʃ-oximidomethylene steroid of claim 1 and a major amount of a pharmaceutical carrier.

7. A composition of claim 6 wherein Z is methyl.

8. A composition of claim 6 wherein the steroid is 3-methoxy - 16ʃ - oximidomethylene - $\Delta^{1,3,5(10)}$ - estratriene-17β-ol.

9. A method of treating hypercholesterolemia in mammals which comprises administering to the mammals an effective amount of at least one 16ʃ-oximidomethylene steroid of claim 1.

10. The method of claim 9 wherein Z is methyl.

11. The method of claim 9 wherein the steroid is 3 - methoxy - 16ʃ - oximidomethylene - $\Delta^{1,3,5(10)}$ - estratriene-17β-ol.

12. A 3 - $OR_1$-16ʃ-alkoximidomethylene-13-Z-$\Delta^{1,3,5(10)}$-gonatriene-17β-ol of the formula

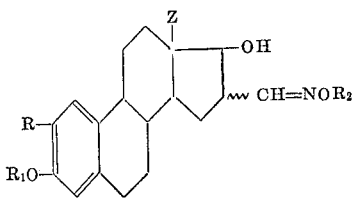

wherein $R_1$ is selected from the group consisting of hydrogen and lower alkyl of 1 to 7 carbon atoms, R is selected from the group consisting of hydrogen, Z is alkyl of 1 to 4 carbon atoms and $R_2$ is lower alkyl of 1 to 4 carbon atoms.

13. A compound of claim 11 which is 3-methoxy-16ʃ-methoximidomethylene - 13β - methyl - $\Delta^{1,3,5(10)}$ - gonatriene-17β-ol.

References Cited

UNITED STATES PATENTS 3,030,357    4/1962    Clinton.

H. A. FRENCH, *Primary Examiner.*